US008500084B2

(12) United States Patent
Cavazzini Gainotti et al.

(10) Patent No.: US 8,500,084 B2
(45) Date of Patent: Aug. 6, 2013

(54) MODULAR SUPPORT STRUCTURE AND MODULE THEREOF FOR CONTAINER HANDLING MACHINES

(75) Inventors: Emilio Cavazzini Gainotti, Parma (IT); Annalisa Malfatto, Parma (IT)

(73) Assignee: Sidel S.p.A., Parma (IT)

( * ) Notice: Subject to any disclaimer, the term of this patent is extended or adjusted under 35 U.S.C. 154(b) by 0 days.

(21) Appl. No.: 12/663,530

(22) PCT Filed: Jul. 29, 2008

(86) PCT No.: PCT/IT2008/000511
§ 371 (c)(1),
(2), (4) Date: Dec. 8, 2009

(87) PCT Pub. No.: WO2010/013263
PCT Pub. Date: Feb. 4, 2010

(65) Prior Publication Data
US 2011/0233376 A1 Sep. 29, 2011

(51) Int. Cl.
*F16M 11/00* (2006.01)
*B65G 21/00* (2006.01)

(52) U.S. Cl.
USPC ..... 248/639; 248/677; 248/188.8; 198/478.1; 198/860.1

(58) Field of Classification Search
USPC ................ 248/639, 644–645, 675–677, 637, 248/188, 188.1, 188.8; 403/171, 172, 96–97; 52/653.2, 239; 198/860.1, 861.1, 478.1, 469.1, 198/480.1, 481.1
See application file for complete search history.

(56) References Cited

U.S. PATENT DOCUMENTS

| | | | | |
|---|---|---|---|---|
| 3,765,541 | A * | 10/1973 | Madey et al. | 211/182 |
| 5,031,371 | A * | 7/1991 | Davister | 403/170 |
| 5,661,942 | A * | 9/1997 | Palmer | 52/653.2 |
| 5,678,706 | A * | 10/1997 | Husak et al. | 403/171 |
| D482,955 | S * | 12/2003 | Segall | D8/382 |
| 6,751,914 | B2 * | 6/2004 | Zeh et al. | 52/239 |
| 7,429,624 | B2 * | 9/2008 | Chen | 524/272 |
| 7,731,022 | B2 * | 6/2010 | Zepf | 198/860.1 |
| 7,743,907 | B2 * | 6/2010 | Weinbrenner et al. | 198/459.2 |
| 2005/0247020 | A1 | 11/2005 | Niesar et al. | |
| 2006/0086061 | A1 | 4/2006 | Bernhard | |
| 2008/0115854 | A1 | 5/2008 | Weinbrenner et al. | |
| 2008/0258034 | A1 | 10/2008 | Zepf | |
| 2011/0233376 | A1 * | 9/2011 | Cavazzini Gainotti et al. | 248/639 |

FOREIGN PATENT DOCUMENTS

| | | | |
|---|---|---|---|
| DE | 10214344 | A1 | 10/2003 |
| EP | 1645537 | A1 | 4/2006 |
| EP | 1714939 | A1 | 10/2006 |
| JP | U11986063267 | | 5/1985 |
| JP | 1994197634 | | 7/1994 |
| JP | 2004035263 | | 2/2003 |
| JP | 2003116344 | | 4/2003 |
| WO | 02051706 | A1 | 7/2002 |
| WO | 2006087088 | A2 | 8/2006 |
| WO | 2006087109 | A1 | 8/2006 |

* cited by examiner

*Primary Examiner* — Tan Le
(74) *Attorney, Agent, or Firm* — Pearne & Gordon LLP

(57) ABSTRACT

A module (4) in a support structure (5) for container handling machines (2), comprises a connecting bar (6) provided with bearing expansions (7) at its ends, each of the bearing expansions (7) being detachably connectable with a corresponding bearing expansion of another module in such a way as to define a support (8) for a star wheel conveyor (3).

18 Claims, 5 Drawing Sheets

MODULAR SUPPORT STRUCTURE AND MODULE THEREOF FOR CONTAINER HANDLING MACHINES

TECHNICAL FIELD AND BACKGROUND ART

The present invention relates to a modular support structure and to a module thereof for container handling machines such as rinsers, filling and capping/seaming machines.

The invention is particularly referred to bottling plants wherein star wheel conveyors and rotating platforms or carousels have to be supported and linked in a structure.

In a first prior art the star wheels are supported on a predrilled solid/massive table in such a way that the positions of the star wheels and of the rotating platforms are fixed and predetermined.

EP-A-1645537 discloses a worktable for container handling machines comprising connecting elements which make up at least the receptacles for the container transport elements and/or connect two or more container handling machines to each other, preferably in the form of a triangle. The connecting elements, preferably constituted by rod-shaped elements may be arranged on different levels and are connected to each other by means of vertical braces. This document replaces the solid/massive table with a tubular structure supporting and connecting the star wheel casings, although this tubular structure is not modular being rigidly predetermined. WO 2006/087088 also discloses a tubular structure: in this case, the star wheel configurations can be selectively varied by means of lateral connecting bars on the star wheel casings which consent removable connections between the star wheel casings and the machine or other star wheel casings.

This document shows in-feed and out-feed star wheels arranged to be driven on column-shaped support housings. Each support housing comprises lateral connection interfaces to which a joint end of a connecting bar is detachably attached, the other joint end being detachably connected to a connection interface of a further support housing or to a machine chassis, such that the star wheel configuration, defining the container transport paths, may be modularly varied.

WO 20061087109 discloses a pre-table system for container handling machines wherein the support housing is fixed to a floor-standing support structure having a tube and/or profile section frame of sections directly or indirectly detachably connected to each other at jointing points by means of the support housing and floor support feet, within which the support housings are arranged in a freestanding manner such that free areas are formed around the support housings and some sections may be combined amongst one another and with support housings such that the star wheel configurations may be varied.

EP-A-1714939 discloses another solution wherein the carousel and the star wheels are rigidly interconnected by means of a plurality of tubes and there is an enclosing structure with panels.

Document DE-10214344 discloses a packaging machine comprising a machine frame having parallel longitudinal elements arranged a distance apart and transverse elements (3) perpendicular to the longitudinal direction of the frame and connected to the longitudinal elements in a form- and/or force-locking manner.

Document WO-021051706 shows a modular system made of steel structural work for a packaging line, said system comprising a casing structure defining a parallelepiped space.

The documents of the prior art do not consent a real effective and easy modularity and it is still difficult to have a plurality of possible layouts able to cover all the needs of the users.

DISCLOSURE OF THE INVENTION

A first aim of the present invention is to avoid the above drawbacks making available an effective, simple and economic modular structure.

Another aim is to make available a modular structure able to contain wires and connections in a protected environment.

This and other aims are fully achieved by the module and by the support structure object of the present invention, which is characterized as in the appended claims.

In particular, the module comprises a connecting bar provided with bearing expansions at its ends, each of the bearing expansions being detachably connectable with a corresponding bearing expansion of another module in such a way as to define a portion of a support. The support structure comprises a plurality of modules detachably interconnected.

BRIEF DESCRIPTION OF THE DRAWINGS

These and other features will be more detailed in the following description of preferred embodiments, shown as mere example, in the annexed drawings, wherein:

the FIG. 1 shows a bottling plant;

Figure 1:
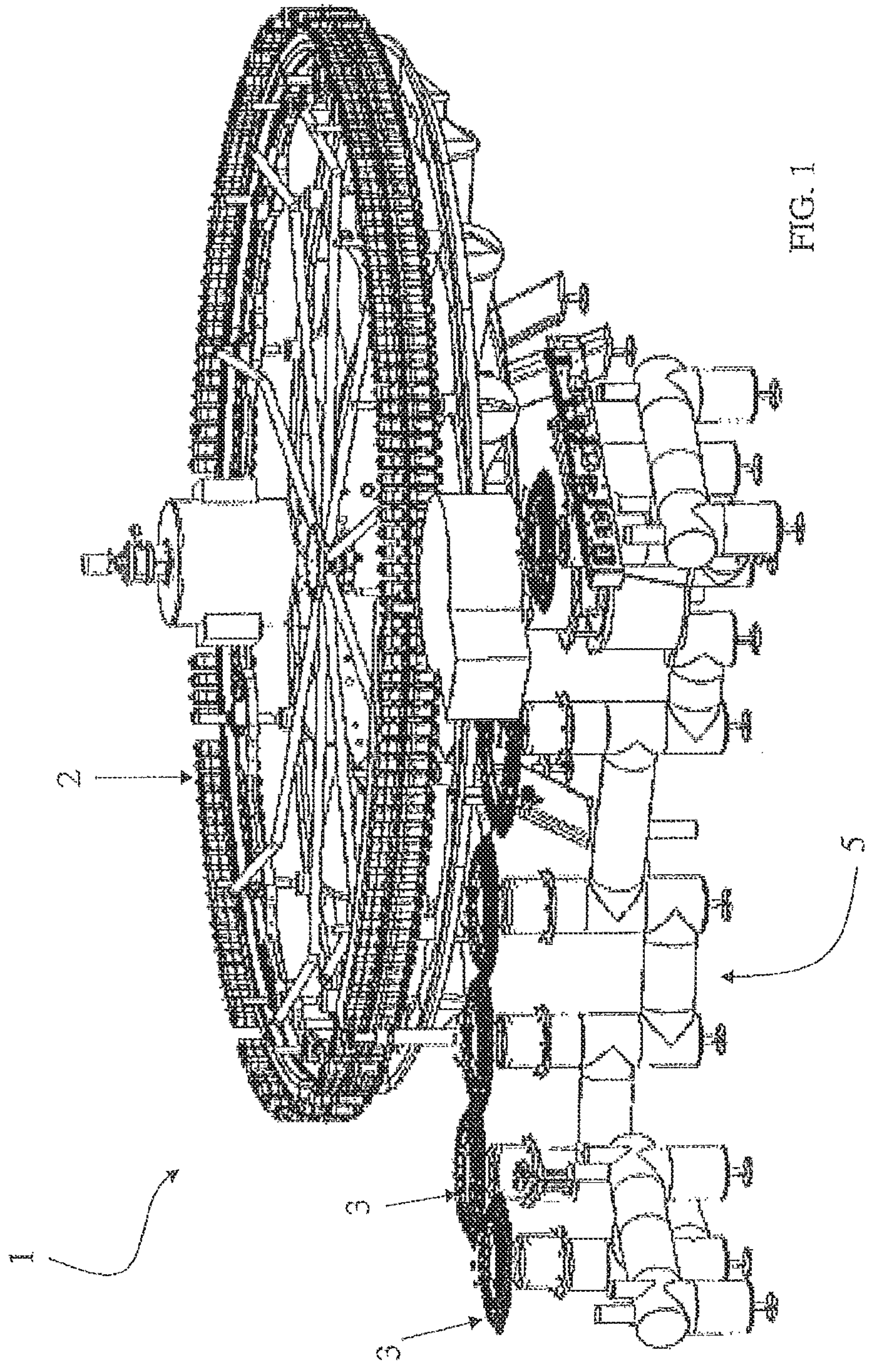
Figure 2:
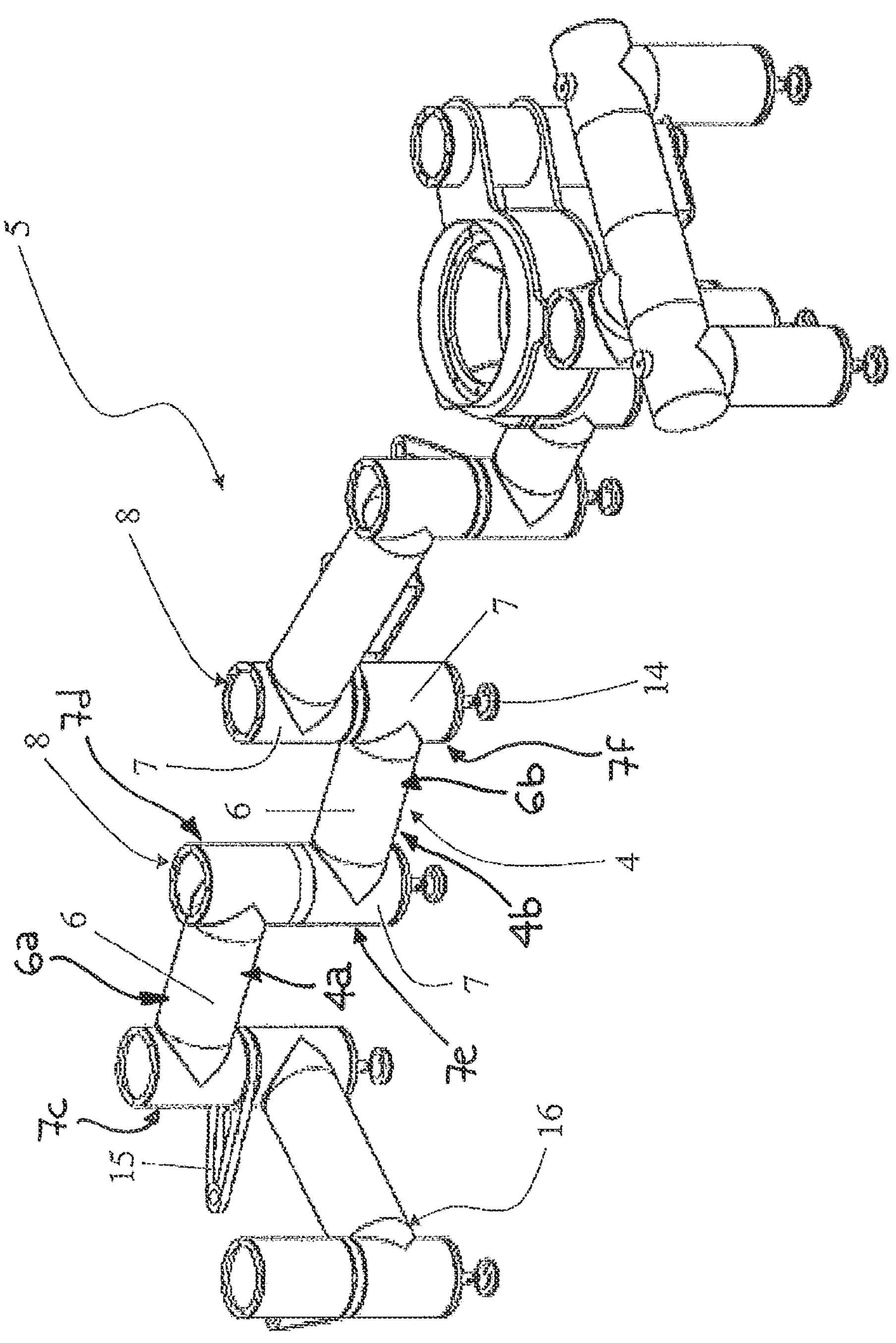
Figure 3:
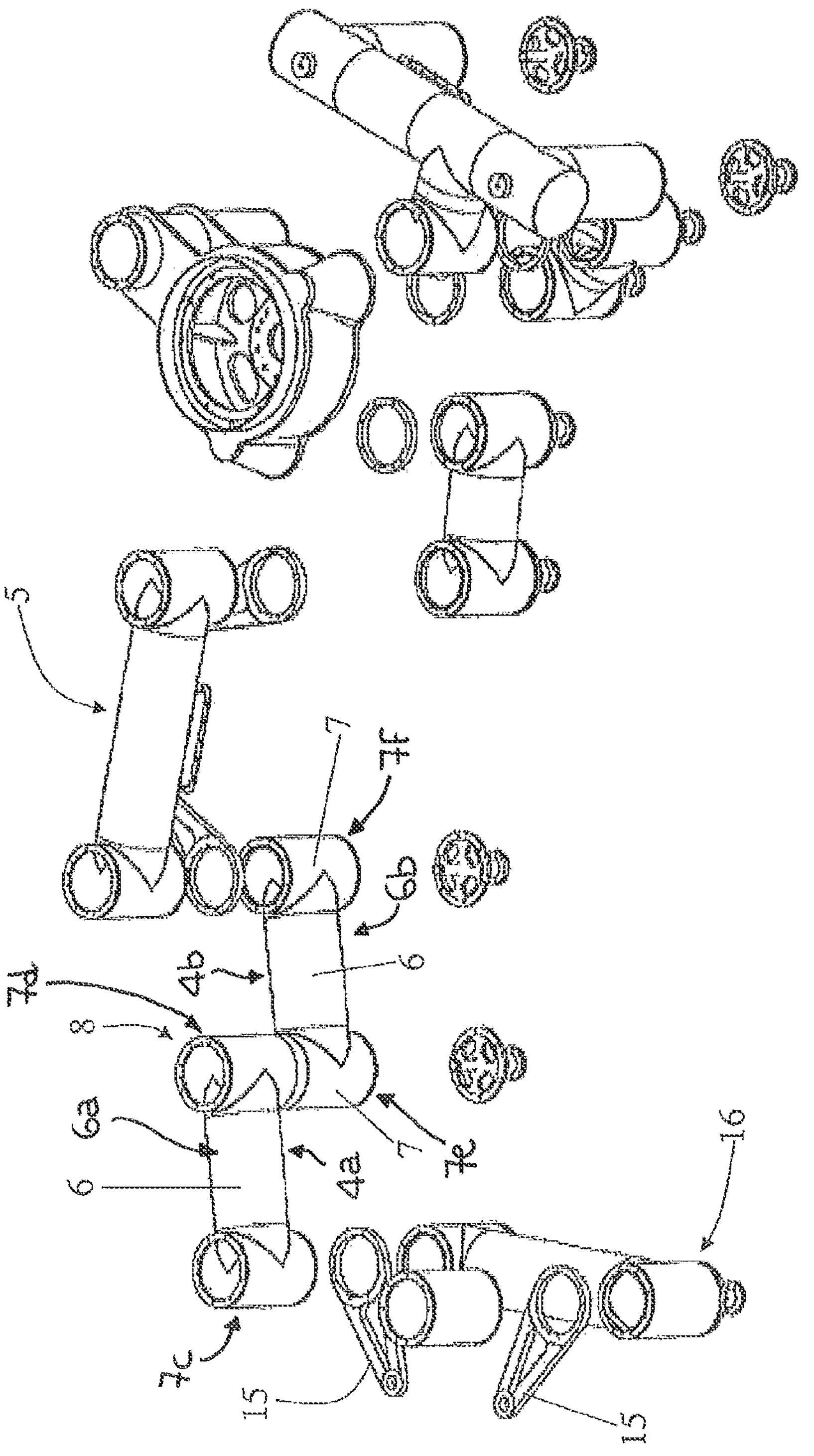
Figure 4:
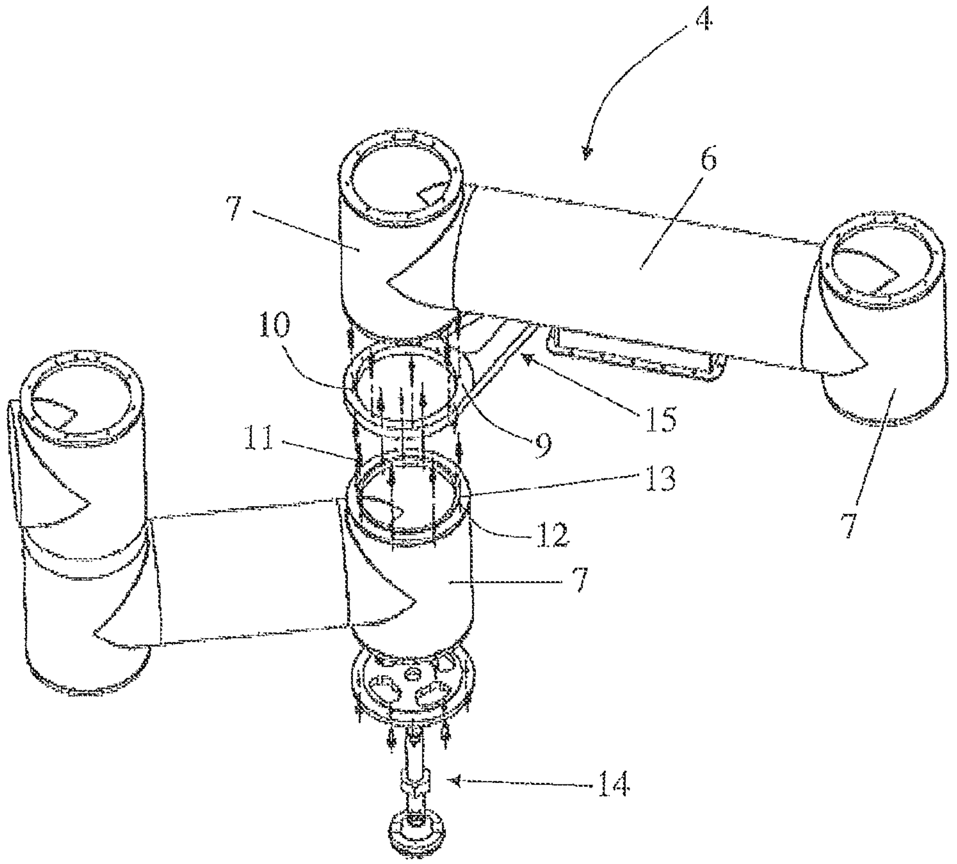
Figure 6:
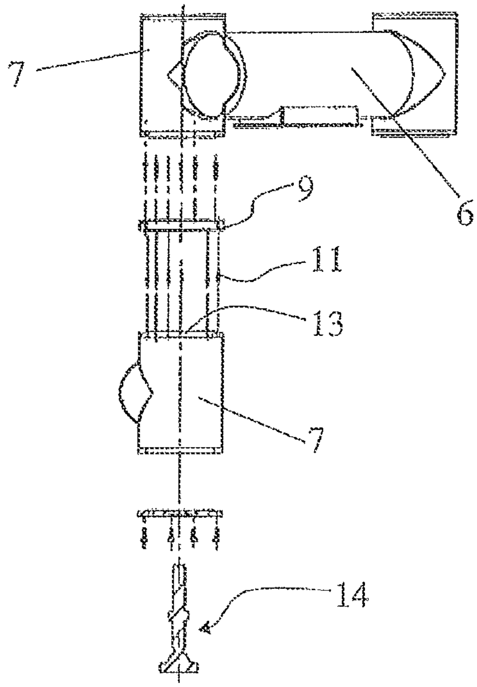
Figure 5:
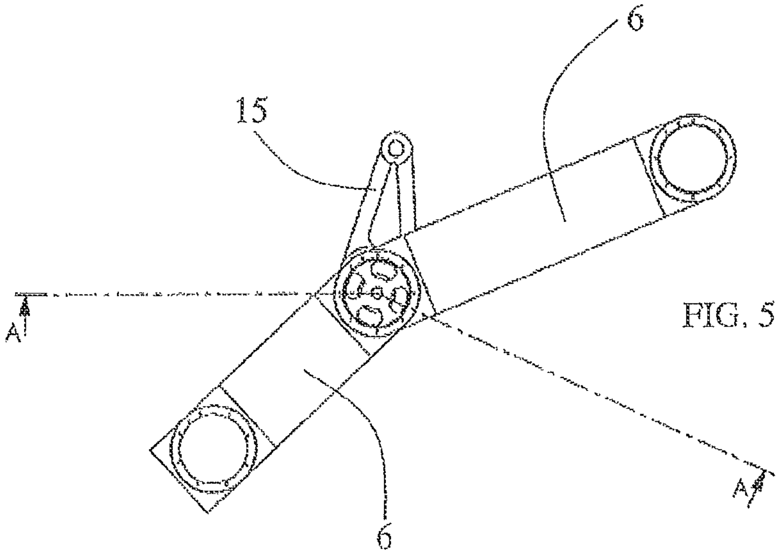

the FIG. 2 shows a perspective view of the modular support structure;

the FIG. 3 shows an exploded view of the modular support structure;

the FIG. 4 shows an exploded view of a particular of the modular support structure;

the FIG. 5 shows a top view of the particular of FIG. 4;

the FIG. 6 shows an exploded section A-A of FIG. 5.

BEST MODE FOR CARRYING OUT THE INVENTION

With reference to the figures, there is represented a bottling plant 1 comprising one or more container handling machines 2 and a plurality of star wheel conveyors 3 only schematically illustrated. An original module 4 for an original support structure 5 comprises a connecting bar 6 provided with bearing expansions 7 at its ends. At each end of the connecting bar 6 there is a bearing expansion 7. Each bearing expansion is detachably connectable with a corresponding bearing expansion of another module in such a way as to define a support 8.

Preferably, the connecting bar is a hollow and tubular connecting bar, designed to be in a horizontal position when it is in place. Preferably, the bearing expansion is a hollow and tubular (or cylindrically shaped) bearing expansion and it is designed to be in a vertical position when it is in place, in such a way as the support 8 is a column-shaped support. In other words, a bearing expansion is perpendicular with respect to the connecting bar to which it is linked, so that from a schematic point of view, each module 4 is a substantially “H-shaped” module.

The tubular connecting bars and bearing expansions are then suitable to accommodate wires and connections, if necessary, in a protected environment.

Advantageously, the connection of the bearings expansions may take place in a plurality of different angular positions such that the support structure 5 made by a plurality of modules 4 can assume different layouts on the ground.

The connection between two consecutive modules is clearly shown in FIG. 4, wherein one bearing expansion 7 of a first module 4 is coaxially superimposed with one bearing expansion 7 of a second module, an interface or flange 9 with a plurality of threaded holes 10 being disposed between the superimposed bearing expansions.

An operator fixes the flange 9 to the lower module by means of connecting means 11, preferably made of screws, (but also bolts or rivets are suitable) inserted from the bottom of the lower bearing expansion and passing through respective holes 12 drilled in a corresponding upper terminal ring 13 of the lower bearing expansion. Then the operator fixes the upper bearing expansion to the flange through screws applied from the top of the upper bearing expansion and passing through a lower terminal ring of the upper bearing expansion.

With particular reference to the embodiment shown in FIG. 4, it is not important the sequence of the above operations (i.e. starting from the bottom or from the top, with reference to the ground surface) but it is important that the last operation is the fixing of a foot 14, otherwise, if the foot was already fixed previously, it would be impossible to insert the screws from the bottom in order to fix the flange.

However, according to an alternative embodiment not shown, a previous fixing of the foot 14 is possible if the bottom of the bearing expansion 7 has a diameter large enough to allow the insertion of the screws by an operator.

Originally, the flange 9 has a plurality of pre-drilled holes, drilled according to the angular position of the two consecutive modules to be connected.

So, it is advisable to have a magazine of flanges (a low-cost element) with different configurations of pre-drilled holes in order to cover all the possible layouts of the modules and of the support structure they originate.

However, the presence of the flange is not strictly necessary, because, as an alternative solution, not illustrated, it is possible to pre-drill a plurality of holes in the terminal rings of the bearing expansions in such a way as the bearing expansions may be connected together (and to the feet) through screws without any flange there between. The number of pre-drilled holes is proportional to, the possible different angular configurations of two consecutively linked modules.

Each foot 14 has the function of supporting the column-shaped support 8 for a star wheel conveyor or for other elements useful or is necessary to the working of the plant, such as linear conveyors, control devices, like a camera and/or a control station and/or a cabinet for storing parts or tooling.

From the foregoing, it results that when modules are in place with respect to the plant, the connecting bars of two consecutively linked modules lie on different horizontal planes under the transport paths of the container handling machine or machines of the plant.

The flange 9 may have an appendix 15 used for the connection to a table (not illustrated) of a container handling machine.

The structure 5 may have terminal modules 16 completed with a single upper or lower bearing expansion (an upper bearing expansion completing a lower module, a lower bearing expansion completing an upper module).

The invention claimed is:

1. Bottling plant comprising a container handling machine and a support structure for the container handling machine, the support structure being located on a horizontal floor and supporting the container handling machine on the horizontal floor, the support structure comprising a first module (4*a*) and a second module (4*b*), the first module comprising a first connecting bar (6*a*) having a first end and a second end, the first connecting bar (6*a*) having a first bearing expansion (7*c*) attached at its first end and a second bearing expansion (7*d*) attached at its second end, the second module comprising a second connecting bar (6*b*) having a first end and a second end, the second connecting bar (6*b*) having a third bearing expansion (7*e*) attached at its first end and a fourth bearing expansion (7*f*) attached at its second end, the second bearing expansion (7*d*) being detachably connected to the third bearing expansion (7*e*) in such a way as to define a support (8), wherein the second bearing expansion (7*d*), is connectable with the third bearing expansion (7*e*) in a plurality of different angular positions such that the support structure (5) can assume different layouts, the first connecting bar (6*a*) having a longitudinal axis which defines a first horizontal plane with respect to the horizontal floor, the second connecting bar (6*b*) having a longitudinal axis which defines a second horizontal plane with respect to the horizontal floor, the first horizontal plane being spaced vertically from the second horizontal plane.

2. Plant as in claim 1, wherein each bearing expansion (7) is a vertical tubular bearing expansion.

3. Plant as in claim 1, wherein each connecting bar (6) and each bearing expansion (7) is a hollow element.

4. Plant as in claim 1, wherein each bearing expansion (7) has at least one terminal ring (13) having a plurality of holes (12) for connecting means (11).

5. Plant as in claim 1, wherein each bearing expansion (7) has holes (12) for connecting means (11).

6. Plant as in claim 1, wherein each bearing expansion (7) has a plurality of holes (12) for connecting means (11) such that different angular positions of linked modules may be obtained depending on the holes (12) engaged by the connecting means (11).

7. Plant as in claim 1, wherein interface elements or flanges (9) are interposed between coaxial and superimposed bearing expansions (7) of different modules (4) such that two consecutive modules may be jointed together in different angular positions.

8. Plant as in claim 7, wherein two superimposed bearing expansions (7) form a column-shaped support (8).

9. Plant as in claim 7, wherein two superimposed bearing expansions (7) and the interface element or flange (9) therebetween form a column-shaped support (8).

10. Plant as in claim 7, wherein feet (14) are provided for supporting the modules (4).

11. Plant as in claim 7, wherein each module (4) supports at least a star wheel conveyor (3).

12. Plant as in claim 7, wherein the connecting bars (6) of two consecutively linked modules (4) lie under the transport paths of the container handling machine (2).

13. Plant as in claim 7, wherein a terminal module (16) is completed by a bearing expansion (7).

14. Plant as in claim 7, wherein the interface elements or flanges (9) connect adjacent bearing expansions (7) of different modules (4) such that two consecutive modules may be jointed together in different angular positions.

15. Plant as in claim 7, wherein each interface element or flange (9) defines a plurality of holes (10) for connecting means (11), said holes (10) defining a specific configuration for the connected bearing expansions (7).

16. Plant as in claim 7, wherein each interface element or flange (9) has an appendix (15) for a connection to a table of the container handling machine (2).

17. Plant as in claim 2, wherein the vertical tubular bearing expansion of one module is coaxially superimposed on the corresponding bearing expansion of another consecutive module, and wherein each said connecting bar is a tubular connecting bar, said tubular bearing expansions and said tubular connecting bars defining a protected environment for accommodating wires and connections extending between said one module and said consecutive module.

18. Plant as in claim 1, wherein the second bearing expansion (7*d*) is located above the third bearing expansion (7*e*).

* * * * *